(12) United States Patent
Nam

(10) Patent No.: US 9,049,659 B2
(45) Date of Patent: Jun. 2, 2015

(54) METHOD AND APPARATUS FOR PROVIDING HIBERNATION OF MULTI-MODE MOBILE TERMINAL

(75) Inventor: Seung Hoon Nam, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 327 days.

(21) Appl. No.: 13/091,591

(22) Filed: Apr. 21, 2011

(65) Prior Publication Data

US 2011/0263290 A1    Oct. 27, 2011

(30) Foreign Application Priority Data

Apr. 21, 2010 (KR) .................. 10-2010-0036910

(51) Int. Cl.
*H04M 1/00* (2006.01)
*H04W 52/02* (2009.01)

(52) U.S. Cl.
CPC .................................. *H04W 52/0225* (2013.01)

(58) Field of Classification Search
CPC .............. H04Q 7/24; H04M 1/00; H04B 1/38
USPC ........... 370/338; 455/419, 448, 552.1, 553.1, 455/574

See application file for complete search history.

(56) References Cited

U.S. PATENT DOCUMENTS

| | | | |
|---|---|---|---|
| 2005/0153736 A1* | 7/2005 | Ganton ...................... | 455/553.1 |
| 2006/0154699 A1* | 7/2006 | Ko et al. ....................... | 455/574 |
| 2007/0129092 A1* | 6/2007 | Doradla et al. .............. | 455/515 |

* cited by examiner

*Primary Examiner* — Myron K Wyche

(57) ABSTRACT

A method and apparatus minimize current consumption related to accessing a local network in a multi-mode mobile terminal. Current location information of the multi-mode mobile terminal is checked through a first communication module. A second communication module for a local network is turned-on when the current location information of the multi-mode mobile terminal corresponds to stored location information. And the second communication module is turned-off when a connection to the local network is interrupted and the current location information of the multi-mode mobile terminal does not correspond to the stored location information.

20 Claims, 4 Drawing Sheets

METHOD AND APPARATUS FOR PROVIDING HIBERNATION OF MULTI-MODE MOBILE TERMINAL

CROSS-REFERENCE TO RELATED APPLICATION(S) AND CLAIM OF PRIORITY

The present application is related to and claims the benefit under 35 U S. C. §119 a of a Korean patent application filed in the Korean Intellectual-Property Office on Apr. 21, 2010 and assigned Serial No. 10-2010-0036910, and the entire disclosure of which is hereby incorporated by reference.

TECHNICAL FIELD OF THE INVENTION

The present invention relates to a power consumption improving method and apparatus in a mobile terminal and, more particularly, to a method and an apparatus for providing hibernation for minimizing power consumption during an operation for accessing a local network in a multi-mode mobile terminal that supports heterogeneous networks.

BACKGROUND OF THE INVENTION

In recent years, with the development of wireless technology, wired networks have been replaced by wireless networks. That is, because wireless technology addresses mobility restrictions of the wired network, research into various technologies that use the wireless network has been active. In particular, research into technology that uses a mobile communication network for a mobile communication service and a local network for a Wireless Local Area Network (WLAN) service, and technologies combining the mobile communication network with the local network has been conducted among technologies that use a wireless network of various schemes.

Meanwhile, because the local network has a relatively high service speed and a low service cost, it has been rapidly extended. However, the local network has a disadvantage in that it provides a narrow service zone and low mobility. In contrast, the mobile communication network has low service speed and a high service cost. However, the mobile communication network has an advantage in that it supports a wide service zone and high mobility.

For this reason, recently, mobile convergence technology that combines the mobile communication network with the local network to be operatively associated with each other has been developed. A multi-mode mobile terminal that supports Radio Access Technology (RAT) allowing a user to access both of the mobile communication network and the local network has been also developed. The mobile communication network may include networks that support communication schemes such as Global System for Mobile Telecommunication (GSM), Universal Mobile Telecommunications System (UMTS), International Mobile Telecommunications-2000 (IMT-2000), Code Division Multiple Access (CDMA), and Wideband Code Division Multiple Access (WCDMA). The local network may include networks that support communication schemes such as Wireless Fidelity (WiFi) and Worldwide Interoperability for Microwave Access (WiMAX).

The multi-mode mobile terminal may use an Internet Protocol (IP) based wireless service such as a portable Internet of high speed data through an Access Point (AP) of the local network as well as a mobile communication service through a base station of the mobile communication network as mentioned above.

To use a wireless service through an AP, the multi-mode mobile terminal continuously performs a scan operation for a local network until it accesses a certain AP. Furthermore, the multi-mode mobile terminal periodically attempts a scan operation to scan a local network with the highest preference in a state connecting with the mobile communication network. In addition, the multi-mode mobile terminal maintains connection with the mobile communication network in a state connecting with the local network to prevent breaking from the local network.

Accordingly, the multi-mode mobile terminal performs an unnecessary AP scan operation although an AP of the local network does not exist. Moreover, although a user uses only one network (e.g., mobile communication network) at a time, the multi-mode mobile terminal performs connection and scan for the local network. This causes the multi-mode mobile terminal to continuously consume unnecessary power for connection with the local network.

SUMMARY OF THE INVENTION

To address the above-discussed deficiencies of the prior art, it is a primary object to provide hibernation for improving power consumption of a multi-mode mobile terminal.

The present invention further provides a multi-mode mobile terminal that supports hibernation, and a control method for controlling the turning-on/off of a communication module for accessing a local network according to previously defined location information therein to minimize power consumption of the multi-mode mobile terminal.

The present invention further provides a new power saving environment for controlling the turning-on/off of a communication module that supports a local network according to previously defined location information in a multi-mode mobile terminal to improve power consumption.

In accordance with an aspect of the present invention, a method for improving power consumption in a multi-mode mobile terminal is provided. A current location information of the multi-mode mobile terminal is checked through a first communication module. A second communication module for a local network is turned-on when the current location information of the multi-mode mobile terminal corresponds to at least one stored location information. And the second communication module is turned-off when a connection to the local network is interrupted and the current location information of the multi-mode mobile terminal does not correspond to at least one stored location information.

In accordance with another aspect of the present invention, a multi-mode mobile terminal includes a first communication module for communicating with a mobile communication network and receiving current location information of the multi-mode mobile terminal. A second communication module communicates with a local network. A storage unit stores a location information list in which at least one stored location information is mapped to access point (AP) information of at least one AP of a corresponding local network. And a controller turns-on the second communication module when the current location information corresponds to at least one stored location information in the location information list, and turns-off the second communication module when a local network connection is interrupted and the current location information does not correspond to at least one stored location information of the location information list.

In accordance with yet another aspect of the present invention, a method of reducing power consumption in a mobile terminal that supports multiple communication modules is provided. A current location of the mobile terminal is received through a first communication module. A second communication module is managed based on the current location and a network mapping table. The second communication module supports local network connections, and the network mapping table maps stored locations to at least one access point (AP) of a corresponding local network.

As described above, a method and an apparatus that provide hibernation of a multi-mode mobile terminal, according to an embodiment of the present invention, provide a method and apparatus providing hibernation capable of improving power consumption in a multi-mode mobile terminal that supports heterogeneous networks, such as a mobile communication network and a local network. The present invention may turn-on/off a communication module in a multi-mode mobile terminal for accessing a local network according to previously defined location information. Accordingly, the present invention may turn-on a communication module that supports a local network at user-defined locations.

The present invention may turn-on/off a communication module that supports a local network according to previously defined location information to reduce both power consumption and an average AP scan time according to AP scan of a local network in a multi-mode mobile terminal. The present invention may turn-on a corresponding communication module based on location information of a multi-mode mobile terminal and start an AP scan operation to check turning-on location of the communication module. Accordingly, the present invention may reduce an average scan time for an AP scan by scanning only APs that correspond to the location information.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged mobile terminal. Detailed descriptions of well-known functions and structures incorporated herein may be omitted to avoid obscuring the subject matter of the present invention.

The present invention relates to a multi-mode mobile terminal capable of supporting heterogeneous networks such as a mobile communication network and a local network and a method that supports hibernation for improving power consumption therein. In the present disclosure, the term "hibernation" refers to a mode that controls turning-on/off a communication module for accessing a local network according to previously defined location information to minimize unnecessary power consumption for accessing the local network in a multi-mode mobile terminal.

In general, zones for connecting with an AP of a local network such as Wireless Local Area Network (WLAN) are limited to a user's home, office, and hot spot zone. Accordingly, the present invention may turn-on a communication module of a local network for AP access to the local network in only the foregoing zones and turn-off the communication module of a local network in other zones to reduce power consumption and an average AP scan time.

The mobile communication network may include networks that support communication schemes such as Global System for Mobile Telecommunication (GSM), Universal Mobile Telecommunications System (UMTS), International Mobile Telecommunications-2000 (IMT-2000), Code Division Multiple Access (CDMA), and Wideband Code Division Multiple Access (WCDMA). The local network may include networks that support communication schemes such as Wireless Fidelity (WiFi) and Worldwide Interoperability for Microwave Access (WiMAX).

Hereinafter, a construction and an operation method of a multi-mode mobile terminal according to an embodiment of the present invention will be described with reference to FIG. 1 to FIG. 4. It is noted that a configuration of a multi-mode mobile terminal and an operation control method thereof according to an embodiment of the present invention are not limited to following subject matters, as they are applicable to various embodiments.

Figure 1:
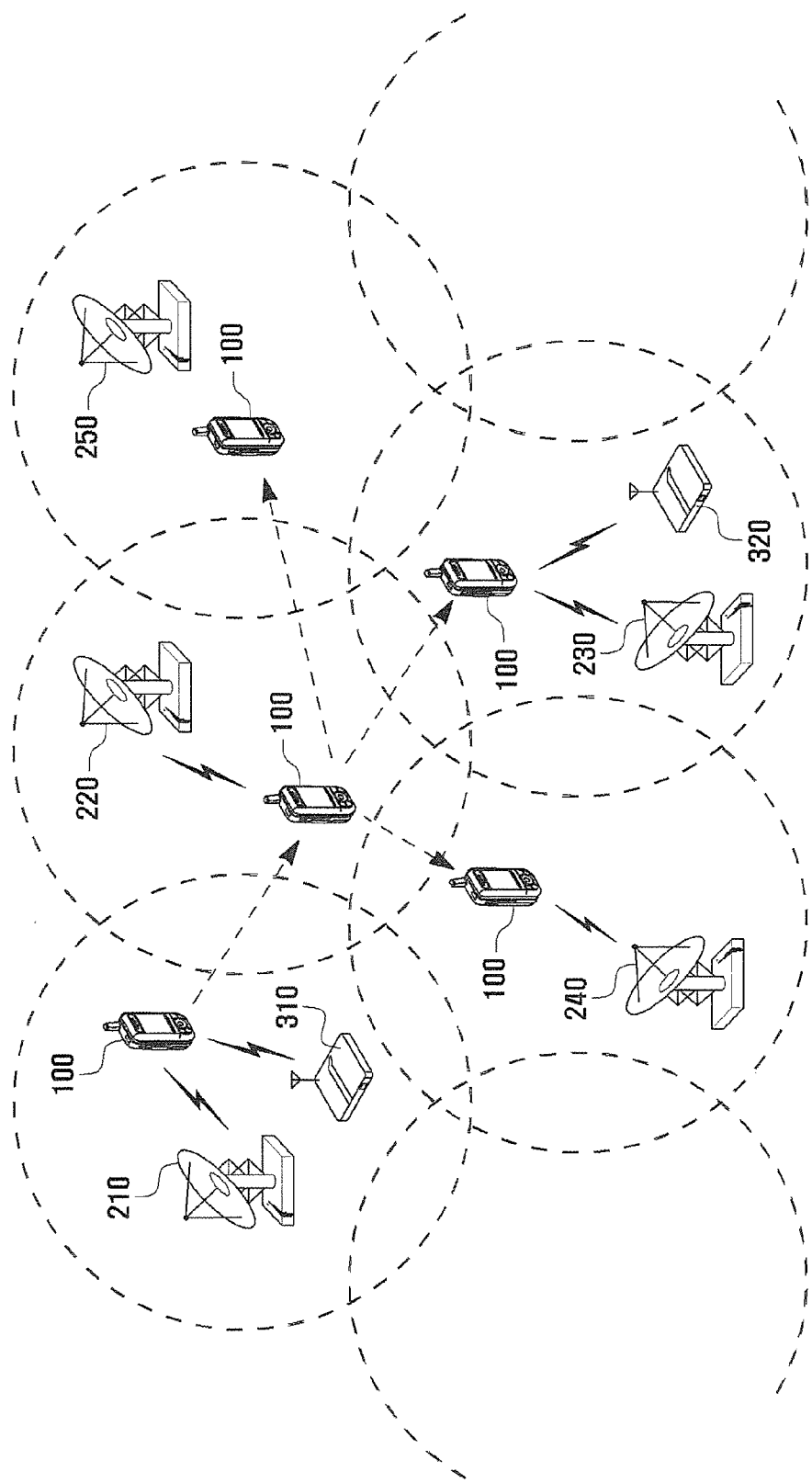
FIG. 1 illustrates a configuration of a system for explaining an operation according to an embodiment of the present invention.

FIG. 1 illustrates a configuration of a system for explaining an operation according to an embodiment of the present invention.

Referring to FIG. 1, a system according to an embodiment of the present invention includes a mobile terminal 100, a mobile communication network, and a local network.

As illustrated earlier, the mobile communication network refers to a network that supports a mobile communication device of a scheme such as GSM, UMTS, IMT2000, CDMA, WCDMA, and OFDMA. The mobile communication network may include base stations 210 to 250 that communicate with the mobile terminal 100 to provide a mobile communication service such as speech communication, image communication, and data communication. In the present disclosure, the term "base station" refers to a Base Station (BS), Base Transceiver Station (BTS), and a Node-B. That is, the base stations 210 to 250 according to an embodiment of the present invention represent any form of base stations according to a communication scheme of a mobile communication network. Furthermore, the mobile communication network may represent a set of plural cells that form coverage by one base station.

As illustrated earlier, a local network such as WLAN that supports an Internet service of a scheme such as WiFi or WiMAX may be included in a certain cell of the mobile communication network. The local network may be established by an enterpriser's cell plan.

The local network may include APs 310 and 320 communicating with the mobile terminal 100 to provide an Internet Protocol (IP) based service. The local network may construct a cell forming coverage by one AP, and the cell of the local network may be included in cells of the mobile communication network. For example, a coverage area by the APs 310 and 320 may be included in a coverage area by the base stations 210 and 230. Cells of plural local networks may be included in each cell of the mobile communication network. Furthermore, no cells of the local network are present in a certain cell of the mobile communication network.

Respective base stations 210 to 250 of the respective cells of the mobile communication network may connect a wireless link with the mobile terminal 100 to form a communication channel that corresponds to a communication scheme (e.g., GSM, UMTS, IMT-2000, CDMA, WCDMA, OFDMA, or the like), and communicate with the mobile terminal 100 to provide a mobile communication service through the formed communication channel.

Respective APs 310 and 320 of the respective cells of the local network may connect a wireless link with the mobile terminal 100 (e.g., WiFi, WiMAX, or the like) to form a communication channel corresponding to the communication scheme, and communicate with the mobile terminal 100 to provide an IP-based service such as portable Internet or Voice over Internet Protocol (VoIP) through the formed communication channel.

The mobile terminal 100 may measure received signal strength indicators (RSSIs) of the mobile communication network and the local network by using signals received from base stations 210 to 250 of the mobile communication network and APs 310 and 320 of the local network, and determine a network with an optimal channel environment based on the measured RSSIs. In this situation, a procedure for determining an optimal channel environment—namely, an optimal cell through received signals—may depend on rules defined in a standard protocol.

Meanwhile, in a configuration of a system as mentioned above, the mobile terminal 100 enters an optimally determined cell of a mobile communication network and accesses a corresponding cell through set Radio Access Technology (RAT). Furthermore, the mobile terminal 100 may measure a level of a downlink (DL) signal received from an accessed cell after accessing the corresponding cell and levels of downlink signals received from neighbor cells. The mobile terminal 100 may determine a presence of movement to the corresponding cell upon measuring an optimal cell than an accessed cell. The mobile terminal 100 may also access a corresponding mobile communication network or local network according to the determined cell and receive a continuous service according to the movement between services or networks corresponding to the accessed network.

However, APs 310 and 320 of a local network as shown in FIG. 1 are not arranged in greater detail than a base station of a mobile communication network by cell plan. Accordingly, a local network may be absent in a certain cell (e.g., cell formed by cells of reference numerals 220, 240, and 250) of a mobile communication network in which the mobile terminal 100 is currently included. Namely, an AP of a local network adjacent to the mobile terminal 100 may be absent at a current location of the mobile terminal 100. As illustrated above, the mobile terminal 100 continuously performs a procedure for scanning a local network in a zone at a periphery of the mobile terminal 100 where an AP of the local network is absent. In this situation, because the local network does not exist at a periphery of the mobile terminal 100, although a network is scanned, there are no scanned local networks. This causes the mobile terminal 100 to perform an unnecessary scan with respect to a local network absent in a current location. As a result, processing is continuously performed according to a scan of absent local network that results in the unnecessary power consumption in the mobile terminal 100.

Furthermore, a local network may be present in a certain cell (e.g., cell formed by a base station 230) of a mobile communication network in which the mobile terminal 100 is included. That is, an AP 320 of a local network may be present in a current located zone of the mobile terminal 100 to be adjacent to the mobile terminal 100. However, although the mobile terminal 100 accesses the AP 320, a user may not substantially use an Ip-based service by the AP 320. Moreover, the mobile terminal 100 may maintain connection to a mobile communication network while accessing the local network to prevent breaking the connection. Accordingly, although the user substantially uses one network (e.g., mobile communication network) at a time, the mobile terminal 100 performs processing for connection and scanning for two networks. This leads to unnecessary power consumption in the mobile terminal 100. As mentioned above, when a user does not actually use an Ip-based service although the AP 320 of a local network is available, maintenance of connection with the local network causes unnecessary power consumption.

It is not uncommon that a zone at which a user connects an AP of a local network to use a service is restricted. For example, the zone may be limited to a user's home, office, and frequently visited place (e.g., hot spot zone in which an AP is installed). Accordingly, in an embodiment of the present invention, a mobile terminal turns-on a communication module for a local network only at a previously defined location (within a cell formed by an AP 310) and turns-off the communication module at other locations to minimize unnecessary power consumption.

This will be described in a description of an operation control method of a mobile terminal.

Figure 2:
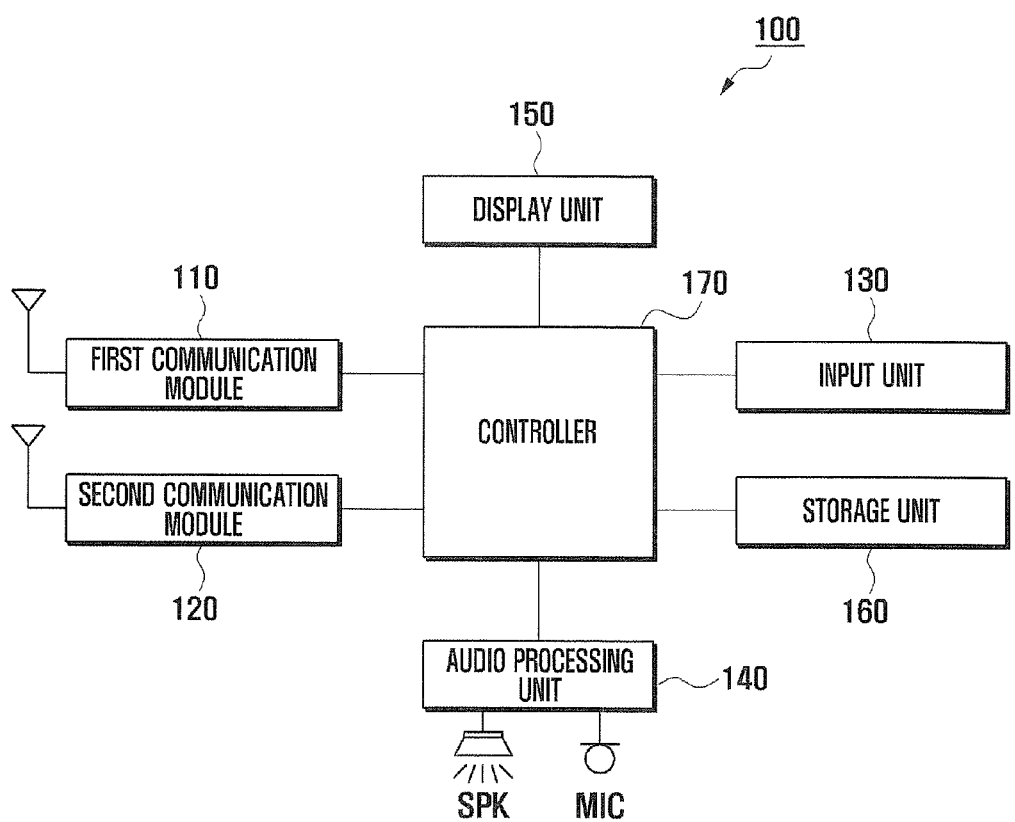
FIG. 2 illustrates a configuration of a mobile terminal according to an embodiment of the present invention.

FIG. 2 illustrates a configuration of a mobile terminal according to an embodiment of the present invention.

Referring to FIG. 2, the mobile terminal 100 includes a first communication module 110, a second communication module 120, an input unit 130, an audio processing unit 140, a display unit 150, a storage unit 160, and a controller 170. The mobile terminal 100 may further include a camera module for executing a photographing function, a digital broadcasting module for receiving and playing a digital broadcasting (e.g., mobile broadcasting such as Digital Multimedia Broadcasting (DMB) or Digital Video Broadcasting (DVB)), a Bluetooth communication module for executing a Bluetooth communication function, and an Internet communication module for executing an Internet communication function.

The first communication module 110 supports mobile communication based wireless communication of the mobile terminal 100. The first communication module 110 forms a set protocol based communication channel with a supporting network to transmit and receive signals associated with wireless communication under the control of the controller 170. The first communication module 110 may include a transceiver for up-converting a frequency of a transmitted signal, amplifying the transmitted signal, low-noise-amplifying a received signal, and down-converting the received signal, and an antenna for transmitting and receiving Radio Frequency (RF). The first communication module 110 communicates with a base station of a mobile communication network, and receives and transfers location information that may be provided periodically from the mobile communication network to the controller 170. For example, the first communication module 110 may receive a Location Area Code (LAC) periodically provided from a mobile communication network of a GSM scheme.

The second communication module 120 supports IP-based Internet communication of the mobile terminal 100. The second communication module 120 forms a set protocol based Internet communication channel with a supportable network to transmit and receive signals associated with the Internet communication under the control of the controller 170. The second communication module 120 may form an Internet communication channel with a local network under the control of the controller 170. The second communication module 120 may include a transceiver for communicating with an AP of a local network such as WLAN and processing a transmitted signal and a received signal according to given rules, and an antenna for transmitting and receiving a wireless signal. The second communication module 120 may be turned-on/off under the control of the controller 170 according to location information of the mobile terminal 100.

The input unit 130 detects a user interaction, and generates and transfers a corresponding input signal to the controller 170. The input unit 130 may include a plurality of buttons. In an embodiment, the input unit 130 may include at least one button or user interface for generating an input signal according to user selection for turning-on/off of a communication module (e.g., second communication module 120) for a local network.

The audio processing unit 140 may include a speaker SPK for playing an audio signal of the mobile terminal 100 and a microphone MIC for collecting an audio signal such as user's voices. The audio processing unit 140 converts an audio signal received from the microphone MIC into data, and outputs the converted data to the controller 170. The audio processing unit 140 outputs an audio signal input from the controller 170 using the speaker SPK. Furthermore, the audio processing unit 140 may output various audio signals generated by the mobile terminal 100 according to user selection. For example, the audio processing unit 140 may output an audio signal generated according to playback of video data or audio data and an audio signal for an alarm according to the execution of a certain function (e.g., turning-on/off of the mobile module 120).

The display unit 150 provides respective interface screens of applications supported by the mobile terminal 100. For example, the display unit 200 provides screens of a message function, an electronic mail function, an Internet function, a web browser function, a multi-media function, a searching function, a communication function, an electronic book reading function (e.g., e-book), a moving image function, a photographing function, a photograph viewing function, a TV watching function (e.g., mobile broadcasting such as DMB or DVB), a music playing function (e.g., MP3), a widget function, and so forth. A Liquid Crystal Display (LCD) is generally used as the display unit 150. However, other display devices such as an Organic Light Emitting Diode (OLED) and Active Matrix OLED (AMOLED) may be used as the display unit 150.

Upon displaying screen data, the display unit 150 may provide a horizontal mode or a vertical mode. The display unit 200 may include a touch input unit (not shown). That is, the display unit 150 may be implemented by a touch screen. The display unit 150 may generate and transfer an input signal (e.g., touch signal) according to user input by a construction of a touch screen to a controller 170. Furthermore, the display unit 150 may visibly display screen data operating according to turning-on/off of the second communication module 120.

The storage unit 160 may store all types of programs and data executed and processed by the mobile terminal. The storage unit 160 may be configured by at least one volatile memory device and non-volatile memory device. For example, the storage unit 600 may continuously or temporarily store an OS of the mobile terminal 100, programs and data associated with a control operation of a communication function by the first communication module 110, programs and data associated with a control operation of a communication function by the second communication module 120, programs and data associated with a control operation of turning-on/off of the second communication module 120, and programs and data associated with a display control operation of the display unit 150. The storage unit 160 may store a data structure that maps location information (e.g., LAC information) of a corresponding zone to AP information for controlling turning-on/off of the second communication module 120 according to a location of the mobile terminal 100 and store the mapped result in an information table (e.g., location information list).

For example, a user may store AP information of a zone for turning-on second communication module, namely, a zone where the user may want to use an IP-based service by accessing a local network in the storage unit 160. In this situation, upon storing the AP information, the mobile terminal 100 may map location information (e.g., LAC information) received and updated in a corresponding location of the mobile terminal 100 to the AP information, and store the mapped result. The location information is periodically transmitted from a mobile communication network (e.g., GSM network). The mobile terminal 100 may receive location information periodically provided from the mobile communication network through the first communication module 110. Furthermore, each time the mobile terminal 100 receives the current location information, the mobile terminal 100 may update the location information stored in the storage unit 160. For example, the mobile terminal 100 may periodically update LAC information of the storage unit 160 as LAC information is periodically provided from the GSM network.

The controller 170 controls an overall operation of the mobile terminal 100. The controller 170 may receive and update location information (e.g., LAC information) periodically provided from a mobile communication network (e.g., GSM network). Furthermore, upon registration of an AP existing in a certain zone, the controller 170 may map location information (e.g., LAC information) received at a corresponding location to AP information of a corresponding AP and store the mapped result. Moreover, the controller 170 may compare location information (e.g., LAC information) received from a mobile communication network with at least one location information (e.g., LAC) of an information table stored in the storage unit 160. In this situation, when the location information received from the mobile communication network matches at least one location information of the information table, the controller 170 turns-on the second communication module 120. Moreover, the controller 170 may control access of the second communication module to a local network and control a service operation corresponding to a request from a user.

The controller 170 may check a connection state of a local network while accessing the local network. Furthermore, the controller 170 may compare location information periodically received from a mobile communication network with location information registered in an information table (e.g., location information list). In addition, when connection with the local network is broken, the controller 170 checks whether location information of the mobile terminal 100 is changed. If the connection with the local network is broken and the location information is changed, the controller 170 turns-off the second communication module 120. The controller 170 may operate hibernation according to turning-off of the second communication module 120. Meanwhile, when the connection with the local network is broken and the location information is not changed, the controller 170 may perform an AP rescan of the local network. For example, an access with the local network may be broken due to reduction in signal intensity of a local network environment and entering a shade zone. In this situation, the controller 170 may perform AP rescan.

Moreover, the controller 170, while connected to the local network, may compare location information periodically received from a mobile communication network with location information registered in an information table (e.g., location information list). In addition, upon detecting change of the location information while connected to the local network, the controller 170 may add the changed location information to the information table (e.g., location information table) to map the changed location information to the corresponding AP information and store the mapped result. An operation of the controller 170 will be explained in a description of an operation control process to be described in detail.

The controller 170 may perform all types of control operations associated with various functions of the mobile terminal 100. For example, upon execution of an application of a communication function using a mobile communication network, the controller 170 may control an operation of a communication function by the first communication module 110. In addition, upon execution of an application of a communication function using a local network, the controller 170 may control an operation of a communication function by the second communication module 120.

Figure 3:
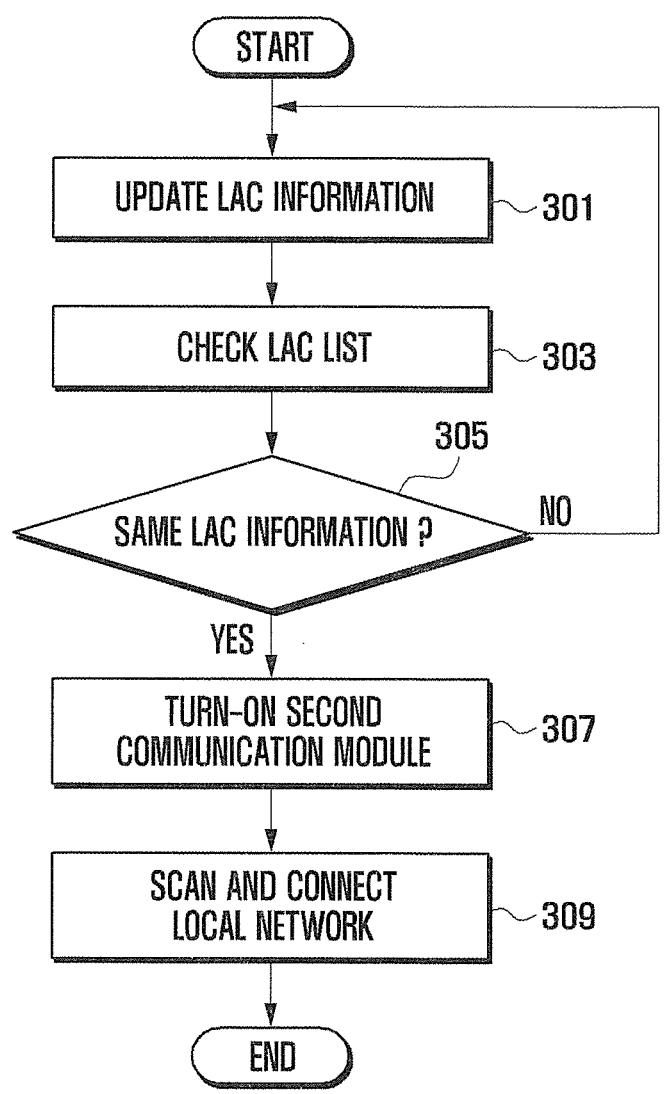
FIG. 3 illustrates a control process for improving power consumption in a mobile terminal according to an embodiment of the present invention.

FIG. 3 illustrates a control process for improving power consumption in a mobile terminal according to an embodiment of the present invention. In particular, FIG. 3 shows an operation before the mobile terminal 100 connects with a local network.

Referring to FIG. 3, a mobile terminal 100 may receive location information (e.g., LAC information) periodically provided from a mobile communication network when accessing the mobile communication network through a first communication module 110. In this situation, it may be assumed that a second communication module 120 for communication with a local network is turned-off. In block 301, a controller 170 of the mobile terminal 100 may update location information in a storage unit 160 using location information periodically received from the mobile communication network.

In block 303, upon updating the location information, the controller 170 may check a previously defined location information list (e.g., LAC list). For example, the controller 170 compares location information (e.g., LAC information or updated location information of the mobile terminal 100) received from the mobile communication network with at least one location information registered (i.e stored) in a location information list to check whether the received location information exists in the location information list corresponding to the received location information in block 305.

Subsequently, when location information does not exist in the location information list (e.g., LAC list) corresponding to the received location information (e.g., LAC information), the controller 170 may return to block 301 and perform the foregoing procedures. In contrast, when at least one stored location information in the location information list (e.g., LAC list) corresponds to the received location information (e.g., LAC information), the controller 170 turns-on the second communication module 120 (block 307). In block 309, the controller 170 may scan a local network by the second communication module 120 and control connection with the local network. In this situation, because the controller 170 may recognize a current location of the mobile terminal 100 based on the location information upon scanning the local network, it may turn-on the second communication module 120 and scan only APs that are registered in a corresponding location upon scanning the local network. This may reduce a scan time according to AP scan of the local network.

Figure 4:
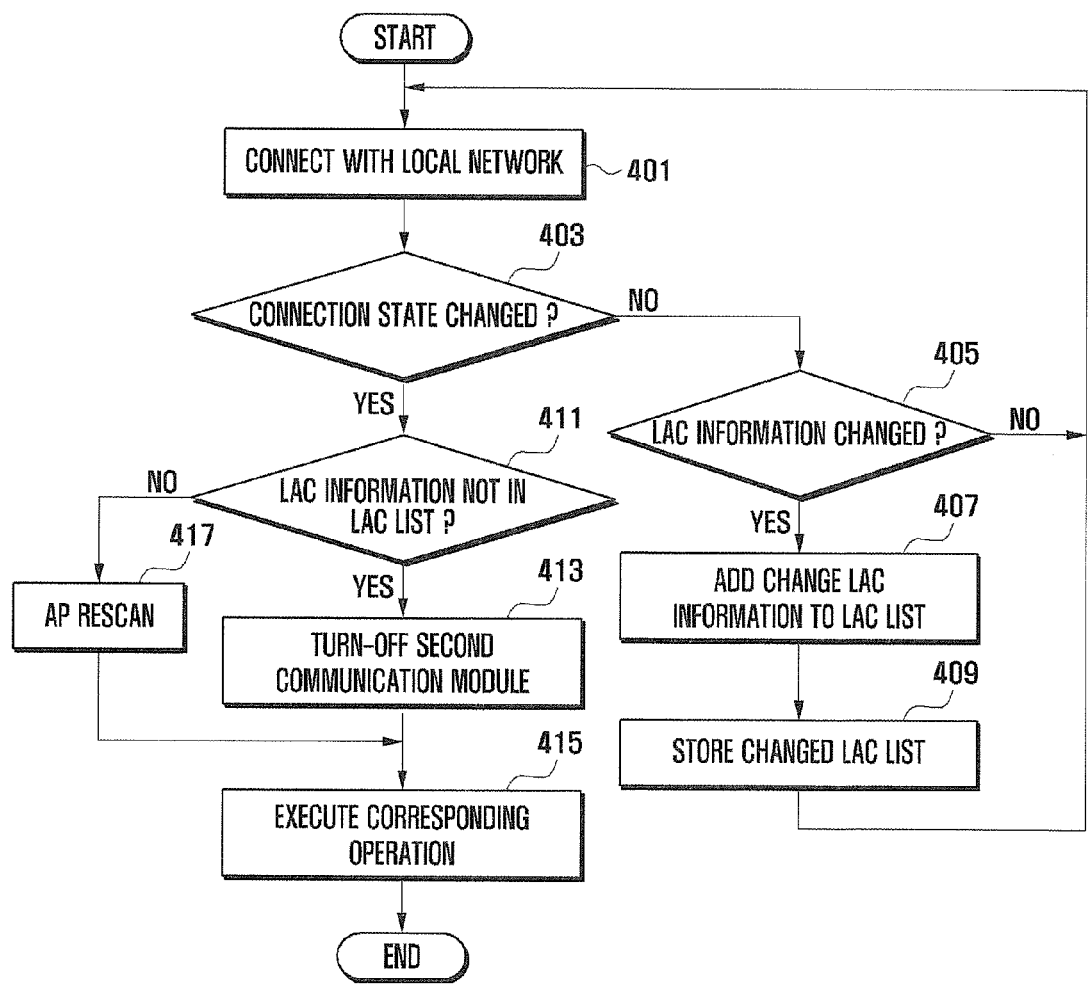
FIG. 4 illustrates a control process for when a mobile terminal connects with a local network according to an embodiment of the present invention.

FIG. 4 illustrates a control process for when a mobile terminal connects with a local network according to an embodiment of the present invention. In particular, FIG. 4 shows an operation after the mobile terminal 100 connects with a local network.

Referring to FIG. 4, it may be assumed that a mobile terminal 100 is connected with a local network through a second communication module 120 (block 401). That is, it may be assumed that the second communication module is turned-on. Furthermore, a controller 170 of a mobile terminal 100 may receive and update location information (e.g., LAC information) periodically provided from a mobile communication network (e.g., GSM network) by the first communication module 110 while it accesses the mobile communication network through a second communication module 120.

Next, the controller 170 may check whether a connection state of an AP of a local network is changed while the mobile terminal 100 is connected to the AP of the local network (block 403). For example, the controller 170 may check whether connection with the AP of the local network is broken.

When the connection state with the AP is not changed (e.g., connection with the AP maintains) ('NO' of block 403), the controller 170, while maintaining the connection with the AP, compares an updated location information (e.g., LAC information) received from the mobile communication network with previously stored location information (e.g., LAC information) of a location information list to check for the presence of the updated location information (block 405). In an embodiment, the controller 170 may check whether at least one location information stored in the location information list corresponds to the received location information.

When the location information is already stored in the location information list ('NO' of block 405), the controller 170 may return to block 401 and repeat the foregoing procedures. In an embodiment, the controller 170 may check whether location information in the location information list corresponds to the received location information. When at least one location information in the location information list corresponds to the received location information, the controller 170 may return to block 401. In some embodiments, the controller 170 may simply determine whether the currently received location information is different from the last received location information in block 405. If they are the same, then the controller may return to block 401.

In contrast, when the location information is changed ('YES' of block 405), the controller 170 adds the updated location information to the location information list (block 407) and stores the updated location information list (block 409). In an embodiment, the controller 170 first checks whether location information in the location information list corresponds to the received (i.e. updated) location information. When none of the location information in the location information list corresponds to the received location information, the controller 170 may add the received (i.e. updated) location information to the location information list. Namely, although location information is updated, when connection with an AP of the local network is maintained, the controller 170 may map the updated location information in a corresponding location of the mobile terminal 100 to AP information of a corresponding AP and store the new mapping in the location information list.

When the connection state with the AP is changed (e.g. when connection with the AP is cancelled) ('YES' of block 403), the controller 170 compares location information received from the mobile communication network with location information stored in the location information list to check the presence of the received location information (block 411). In an embodiment, the controller 170 may check whether at least one location information in the location information list corresponds to the received location information.

When the location information is already stored in the location information list ('NO' of block 411), the controller 170 may control AP rescan of the local network (block 417). For example, the controller 170 may check whether location information that corresponds to the received location information is included in the location information list. Further, when the location information that corresponds to the received location information is included in the location information list (connection with AP of the local network is broken without changing location information of the mobile terminal 100), the controller 170 may perform an AP rescan of the local network. In this situation, the controller 170 may determine that an access with the local network is broken due to a reduction in signal intensity of a local network environment and entering a shade zone, and perform the AP rescan of the local network. Subsequently, the controller 170 may control execution of a corresponding operation (block 415). For example, the controller 170 may control an AP rescan according to procedures defined in standard protocols.

When the location information is not already stored in the location information list ('YES' of block 411), the controller 170 turns-off the second communication module 120 (block 413). For example, the controller 170 may check whether location information in the location information list corresponds to the received location information. When no location information in the location information list corresponds to the received location information (location information of the mobile terminal 100 is changed and connection with the AP of the local network is broken), the controller 170 may determine that the mobile terminal 100 has moved to a zone (other than locations registered in the location information list) and turns-off the second communication module 120. As such, the mobile terminal 100 may reduce unnecessary power consumption that would have been caused by scanning an absent local network or a local network in a zone that a user does not need or have access to. Next, the controller 170 may turn-off the second communication module 120 and then control execution of a corresponding operation (block 415). For example, the controller 170 may control an operation of FIG. 3 while maintaining connection with a mobile communication network by the first communication module 110.

Meanwhile, a method for providing hibernation of a multi-mode mobile terminal of the present invention as described above may be implemented in a program command form executable by various computer means and be recorded in a computer readable storage device. In this case, the computer readable storage device may include a program command, a data file, and a data structure individually or a combination thereof. In the meantime, the program command recorded in a recording medium may be specially designed or configured for the present invention or be known to a person of ordinary skill in a computer software field to be used.

The computer readable recording medium includes Magnetic Media such as hard disk, floppy disk, or magnetic tape, Optical Media such as Compact Disc Read Only Memory (CD-ROM) or Digital Versatile Disc (DVD), Magneto-Optical Media such as floptical disk, and a hardware device such as ROM, RAM, and flash memory for storing and executing program commands. Furthermore, the program command may include a machine language code created by a compiler and a high-level language code executable by a computer using an interpreter. The foregoing hardware device may be configured to be operated as at least one software module to perform an operation of the present invention, and vice versa.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for improving power consumption in a multi-mode mobile terminal, the method comprising:
checking current location information of the multi-mode mobile terminal through a first communication module;
turning-on a second communication module for a local network when the current location information of the multi-mode mobile terminal being checked through the first communication module corresponds to at least one stored location information; and
turning-off the second communication module when the current location information of the multi-mode mobile terminal being checked through the first communication module does not correspond to at least one stored location information.

2. The method of claim 1, wherein checking location information comprises:
receiving the current location information from a mobile communication network through the first communication module;
comparing the current location information with at least one stored location information in a previously defined location information list; and
checking whether the at least one stored location information in the location information list corresponds to the current location information.

3. The method of claim 2, wherein turning-on the second communication module comprises:
turning-on the second communication module when the at least one stored location information in the location information list corresponds to the current location information.

4. The method of claim 3, further comprising maintaining a turned-off state of the second communication module when no stored location information in the location information list corresponds to the current location information.

5. The method of claim 3, further comprising performing a rescan of the local network using the second communication module when an access to the local network is interrupted and the current location information is not changed while the second communication module is turned-on.

6. The method of claim 3, further comprising adding the current location information to the location information list when the multi-mode mobile terminal is already connected to the local network and no stored location information in the location information list corresponds to the current location information.

7. The method of claim 6, wherein adding the current location information comprises:
    mapping the current location information to an access point (AP) info nation of an AP of the local network, in a corresponding location; and
    storing the mapping result in the location information list.

8. A multi-mode mobile terminal comprising:
    a first communication module configured to communicate with a mobile communication network and receive current location information of the multi-mode mobile terminal;
    a second communication module configured to communicate with a local network;
    a storage unit configured to store a location information list in which at least one stored location information is mapped to access point (AP) information of at least one AP of a corresponding local network; and
    a controller configured to turn-on the second communication module when the current location information being checked through the first communication module corresponds to at least one stored location information in the location information list, and turn-off the second communication module when the current location information being checked through the first communication module does not correspond to at least one stored location information in the location information list.

9. The multi-mode mobile terminal of claim 8, wherein the controller is further configured to check whether the local network connection is interrupted while the second communication module is turned-on.

10. The multi-mode mobile terminal of claim 9, wherein the controller is further configured to maintain a turned-off state of the second communication module when no stored location information in the location information list corresponds to the current location information.

11. The multi-mode mobile terminal of claim 9, wherein the controller is further configured to control a rescan for a local network using the second communication module when the local network connection is interrupted and the current location information corresponds to a stored location information in the location information list.

12. The multi-mode mobile terminal of claim 9, wherein the controller is further configured to add the current location information to the location information list when the local network connection is maintained and no stored location information in the location information list corresponds to the current location information.

13. The multi-mode mobile terminal of claim 12, wherein the controller is further configured to map the added location information to AP information of an AP that corresponds to the maintained local network connection in a corresponding location and store the mapped result.

14. The multi-mode mobile terminal of claim 8, wherein the controller is further configured to control a scan for at least one AP that is mapped to the at least one stored location information that corresponds to the current location information when the second communication module is turned-on.

15. A method of reducing power consumption in a mobile terminal that supports multiple communication modules, the method comprising:
    receiving a current location of the mobile terminal through a first communication module; and
    managing a second communication module based on the current location and a network mapping table, the first communication module remaining on to check the current location while the second communication module is on, the second communication module for supporting local network connections, and the network mapping table for mapping stored locations to at least one access point (AP) of a corresponding local network.

16. The method of claim 15, wherein managing the second communication module comprises:
    turning-on the second communication module from a turned-off state when the current location corresponds to a stored location in the network mapping table; and
    controlling the second communication module to establish a local network connection with an AP that is mapped to the stored location that corresponds to the current location when the second communication module is turned-on from the turned-off state.

17. The method of claim 15, wherein controlling the second communication module comprises:
    turning-off the second communication module from a turned-on state when a connection to the local network is interrupted and none of the stored locations in the network mapping table corresponds to the current location.

18. The method of claim 15, wherein controlling the second communication module comprises:
    maintaining the second communication module in a turned-off state when none of the stored locations in the network mapping table corresponds to the current location.

19. The method of claim 15, wherein controlling the second communication module comprises:
    when a local network connection is interrupted and the current location corresponds to a stored location in the network mapping table, controlling the second communication module to attempt to re-establish the local network connection by scanning for at least one AP that is mapped to the stored location that corresponds to the current location.

20. The method of claim 15, wherein controlling the second communication module comprises:
    when a local network connection to the local network is currently active and none of the stored locations in the network mapping table corresponds to the current location information, storing a new mapping between the current location and an AP that corresponds to the currently active local network connection.

* * * * *